United States Patent [19]

Buttke et al.

[11] Patent Number: 5,308,476
[45] Date of Patent: May 3, 1994

[54] REDUCED GAS HOLDUP IN AN EBULLATED BED REACTOR

[75] Inventors: Robert D. Buttke, Naperville, Ill.; Lawrence B. Peck, Houston, Tex.; Christos Nikolaides, Lombard, Ill.

[73] Assignee: Amoco Corporation, Chicago, Ill.

[21] Appl. No.: 793,212

[22] Filed: Nov. 4, 1991

Related U.S. Application Data

[63] Continuation of Ser. No. 523,990, May 16, 1990, abandoned.

[51] Int. Cl.⁵ ............................................. C10B 31/02
[52] U.S. Cl. ................... 208/157; 208/153; 208/164; 208/148
[58] Field of Search ................ 208/157, 164, 148, 153

[56] References Cited

U.S. PATENT DOCUMENTS

| | | | |
|---|---|---|---|
| 2,461,172 | 2/1949 | Pelzer | 422/223 |
| 2,560,356 | 7/1951 | Liedholm | 422/140 |
| 2,855,449 | 10/1958 | Owen | 422/320 |
| 2,873,247 | 2/1959 | Borey | 422/140 |
| 2,885,272 | 5/1959 | Kimberlin | 422/140 |
| 2,937,988 | 5/1960 | Pollack | 208/157 |
| 2,981,677 | 4/1961 | Bowles | 208/146 |
| 2,987,465 | 6/1961 | Johanson | 208/146 |
| 3,002,805 | 10/1961 | Browning et al. | 422/144 |
| 3,146,189 | 8/1964 | Kunreuther | 208/213 |
| 3,197,288 | 7/1965 | Johanson | 422/140 |
| 3,309,305 | 3/1967 | Scott | 208/112 |
| 3,523,888 | 8/1970 | Stewart et al. | 208/143 |
| 3,557,019 | 1/1971 | Von Driesen | 208/112 |
| 3,605,275 | 9/1971 | Enders | 422/145 |
| 3,698,876 | 10/1972 | Greyali et al. | 208/143 |
| 3,759,669 | 9/1973 | Aaron | 208/157 |
| 3,817,856 | 6/1974 | Aaron et al. | 208/157 |
| 4,111,663 | 9/1978 | Wolk et al. | 208/409 |
| 4,187,169 | 2/1980 | Euzen et al. | 208/157 |
| 4,444,653 | 4/1984 | Euzen et al. | 208/152 |
| 4,478,707 | 10/1984 | Bischoff et al. | 208/157 |
| 4,571,326 | 2/1986 | Bischoff et al. | 422/220 |
| 4,597,856 | 7/1986 | Yoshioka et al. | 208/112 |
| 4,707,340 | 11/1987 | Milligan | 422/140 |
| 4,738,770 | 4/1988 | Hastings et al. | 422/140 |
| 4,750,989 | 6/1988 | Soderberg | 208/146 |
| 4,753,721 | 6/1988 | McDaniel | 208/146 |
| 4,804,458 | 2/1989 | Buttke et al. | 208/146 |
| 4,886,644 | 12/1989 | Chan et al. | 422/140 |
| 4,968,409 | 11/1990 | Smith | 208/157 |

FOREIGN PATENT DOCUMENTS

| | | | |
|---|---|---|---|
| 1177385 | 11/1984 | Canada | 208/157 |
| 60-147232 | 8/1985 | Japan | 422/140 |

*Primary Examiner*—Helane Myers
*Attorney, Agent, or Firm*—Scott P. McDonald; Richard A. Kretchmer

[57] ABSTRACT

A resid refining reactor has an ebullated catalyst bed. Hydrogen gas is released into the catalyst bed at a point which is far enough above a distributor plate at the bottom of the catalyst bed to form a gas updraft in a committed zone through the bed. This committed updraft causes a reduction in gas holdup which increases the residence time of a liquid phase in the catalyst bed.

8 Claims, 2 Drawing Sheets

REDUCED GAS HOLDUP IN AN EBULLATED BED REACTOR

This application is a continuation of application Ser. No. 07/523,990, filed May 16, 1990, now abandoned.

This invention relates to catalytic reactors and more particularly to a reduction of gas holdup in an expanded ebullated bed used—especially, but not exclusively—for resid upgrading.

During hydrotreating, residual oil "resid" is upgraded with hydrogen and a hydrotreating catalyst in a three-phase mixture of oil, catalyst, and vapor or gas bubbles to produce more valuable, lower-boiling liquid products. The gas phase (hydrogen) is required in some minimum quantity in order to carry out the catalytic refining process within the reactor.

In order to increase the efficiency, effectiveness, and profitability of resid hydrotreating, it is desirable to maximize the conversion of resid into more valuable lower boiling liquid products. The extent of the conversion of resid into these more valuable lower-boiling liquid products depends in part on the residence time of the resid inside the reactor which, in turn, depends upon the effective volume of the reactor itself.

In greater detail, a reactor has a very large, sealed chamber containing a catalytic bed. In ebullated (expanded) bed reactors, the reactor oil and catalyst bed are fluidized, ebullated, and expanded. The turbulence of the oil and gas bubbles rising within the chamber lifts and expands the catalyst bed. However, the gas bubbles rising through the bed also occupy space (gas holdup) which tends to reduce available liquid volume for the upgrading reactions. Therefore, the gas bubbles reduce the residence, or dwell time, of the resid within the reactor.

As described thus far, the reactor oil does not usually have enough velocity to properly expand the catalyst bed above its settled level; therefore, some of the reactor oil is recycled within the reactor. More particularly, a portion of the rising oil overflows through a downcomer and then returns to the catalyst bed through an ebullating pump. During this recycling, excessive amounts of the gas phase (vapor) can be entrained in the recycled reactor oil. This vapor can lead to a high internal recirculation of gas which can further cause an even higher gas holdup.

In the normal operation of ebullated bed reactors, the reaction zone contains substantial amounts of vapors or gas bubbles comprising excess hydrogen, light hydrocarbon gases, hydrogen sulfide, ammonia, steam, etc. Excess volume of vapors and gas bubbles can lower process efficiency, decrease product yield and cause various problems. They occupy a substantial portion of the overall volume of the reaction zone that could be more effectively used to upgrade the oil feed.

The invention is designed to reduce gas holdup in order to increase the residence time of the resid within the reactor. The benefits of reduced gas holdup are confirmed by observations of the reactors in operation.

Reduced gas holdup is most likely a result of injecting a concentrated gas stream which flows upwardly in an energetic updraft zone within the reactor. The radial extent of the updraft zone may be limited either by baffles or by naturally occurring flow patterns. Injecting gas directly into the updraft zone at some elevation above the distributing grid increases velocities in the updraft zone, thereby reducing gas holdup.

Another factor in reducing gas holdup may be an increase in bubble size. As the bubble size increases, the buoyant forces increase to a greater degree than the drag force increase; therefore, large bubbles rise faster through the bed than small bubbles rise. A faster bubble rise velocity increases the true velocity of gas and reduces holdup. The initial bubble size might depend, to at least some extent, on the pressure drop across a distributor plate. By injecting gas above this plate, pressure drop is reduced, and the bubble size increases, resulting in a decrease in gas holdup.

Regardless of theory, it has been found that there is a close relationship between reactor liquid volume and reactor gas holdup. More particularly, resid conversion is to some extent a thermal reaction, with the catalyst serving to stabilize the cracked products. For the thermal reaction, the resid conversion increases with an increase in temperature and with an increase of the dwell or residence time of the liquid within the reactor. Since the residence time varies directly with liquid volume within the reactor, an increase in the liquid volume (decrease in gas volume) increases the amount of resid conversion. The Ramscarbon conversion also increases because the reaction of coke precursors depends strongly upon thermal reactions. In a large refinery, this amount of increased resid and Ramscarbon conversion can bring an economic advantage which may easily exceed $1.5 million per year at today's prices.

Hence, there is a dilemma since a certain minimum amount of reactant gas is necessary, but it is undesirable for the reactant gas to occupy a large volume of the reactor. There is a constant need for reducing gas holdup without sacrificing the amount of hydrogen that is necessary for upgrading reactions.

Accordingly, an object of the invention is to provide new and improved means for and methods of reducing gas holdup in an expanded catalytic bed.

In keeping with an aspect of the invention, these and other objects are accomplished by providing separate reactor inlets for the liquid and gas phases. The liquid phase is fed into the reactor at a level which is beneath a distributor plate. The distributor plate has many holes which distribute the liquid fairly uniformly into the catalyst bed. The gas phase is fed into the reactor at a level which is higher than the distributor plate. When the gas is released at this level, the resulting updraft produces less gas holdup and improves the refining process.

BRIEF DESCRIPTION OF THE DRAWINGS

The invention may be understood best from a study of the attached drawings, wherein:

FIG. 1 shows a reactor 20 which is somewhat similar to those shown in a number of U.S. Patents including U.S. Pat. Nos. 3,197,288; 4,753,721; and 4,804,458. In general, this reactor includes inlet 22 for fresh catalyst, inlet 24 for the liquid phase (resid), and inlet 26 for the gas phase (hydrogen). A pipe 27 provides for withdrawal of spent catalyst.

Figure 1:
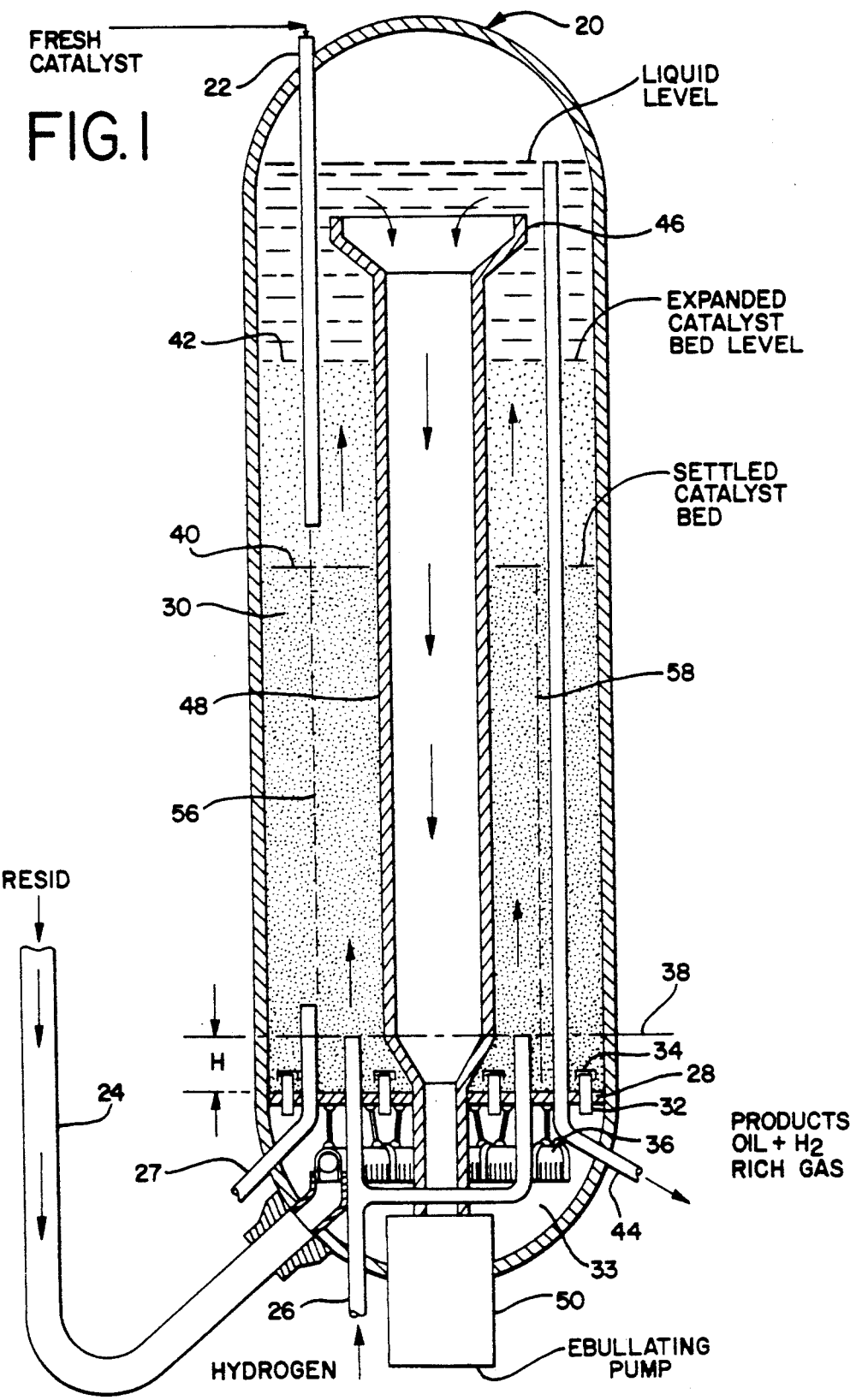
FIG. 1 is a vertical cross-section of a reactor which may use the invention.

A distributor plate 28 provides a platform for receiving and supporting a bed 30 of catalyst. The catalyst is composed of porous pellets. The distributor plate 28 has holes at many points to enable the liquid phase to flow upwardly into the catalyst bed. Each hole in the distributor plate includes a riser pipe 32 topped by a bubble cap 34 and filled with a ball check valve for preventing the catalyst from falling through pipe 32 while enabling a passage of liquid from plenum 33 and into the catalyst bed 30. Another distribution device is a somewhat toroidal-shaped member 36 which distributes the incoming liquid phase (resid) around a circumference within the plenum and releases it more uniformly to the risers 32.

According to the invention, hydrogen is introduced into the reactor via pipe 26 that extends to a level 38, at a height H above the top level of the distributor plate 28. The introduction of the gas phase at this height allows hydrogen gas bubbles to form above the distributor plate 28. Thus, the newly formed gas bubbles are not broken up as severely as they would be if they had to travel through the turbulent flow in the risers and bubble caps. Introducing gas above the distributor plate also concentrates the gas and directs it toward updraft zones. This will help to reduce gas holdup by restricting more of the gas to the updraft zones, where gas rises rapidly through the reactor.

The petroleum refining process creates lighter materials (such as gasoline) which exit at the top of a pipe 44 thus, withdrawing the materials from the reactor. At a level which is lower than the top of pipe 44 is a pan 46 leading to a downcomer 48 which recirculates a certain percentage of the liquids to an ebullating pump 50 which pumps the fluid back into and through the catalyst bed 30.

For simplicity and convenience of description, the hydrogen inlet is shown in FIG. 1 as a simple "Y" shaped pipe which raises to a level 38 where the gas phase is introduced into the catalyst bed at two concentrated points. Within reason, the gas may be released at almost any height within the catalyst bed. One desirable approach is to release the gas at a plurality of injection points (preferably four or more) which are spaced around the axis of the reactor, as shown at 26a-26d, FIG. 2. Actually, there is a broad array of locations for the injection points. Therefore, the invention is broad enough to cover gas injection at any suitable point, although in many uses the distance from the reactor wall may be an important consideration.

If desired, means may be provided for maintaining a separation between gas bubbles formed when the gas phase is introduced into the catalyst bed and gas entrained in the liquid phase recirculated through said downcomer.

It may be desirable to install one or more baffles inside the reactor in order to guide and direct various updraft streams within the reactor. The object is to restrict gas to substantially the gas updraft zone.

Two spaced, vertical dot-dashed lines 56, 58 are drawn in FIG. 1 to generally identify a position where a baffle may be appropriate. These lines are a generic disclosure of any suitable baffling which may guide and direct the upflow of gas. This baffle position extends from a level (at or above the top as of pipe 26) that is lower than the level at which the gas is released; or, at least at a point where the rising gas bubbles will most likely follow a path that is inside the baffle. The baffle should extend upwardly far enough so that the gas bubbles are fairly well committed to following a desired updraft path before the baffle ends. The baffles should not extend far enough up or down to interfere with such housekeeping functions as loading new or fresh catalyst and removing old and spent catalyst.

There should be a means for and method of enabling the liquid phase within the reactor to circulate freely through the catalyst bed. In greater detail, the gas bubbles have a buoyancy which causes them to rise in a more or less vertical path, from the bottom straight up to the top of the reaction. The liquid, on the other hand, tends to recirculate within the reactor and move from the bottom of the reactor, to the top, and then again to the bottom of the reactor.

Figure 2:
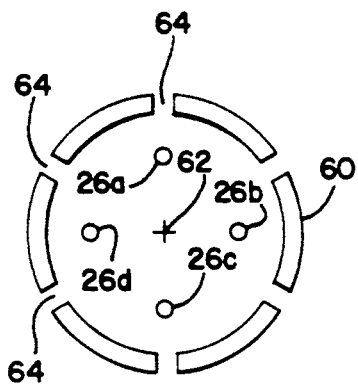
FIG. 2 is a horizontal cross-section of a reactor showing one embodiment of a baffle and how and where gas may be injected into an exemplary reactor.

FIG. 2 shows one treatment for allowing liquid circulation and for constraining the radial extent of the gas updraft zone. The baffle 60 has a generally cylindrical shape centered on the axis 62 of the reactor. A number of vertical slots 64 extend through at least some, and maybe all, of the length of the baffle. Thus, liquid is free to move through these slots, into and out of the interior area of the baffle. The gas rises straight upwardly in generally separate streams on the inside and outside of the baffle respectively. Thus, the slots 64 do not have a significant effect upon the circulation of the oil, while the baffle plates 60 prevent a diversion of the gas in its upward travel.

Figure 3:
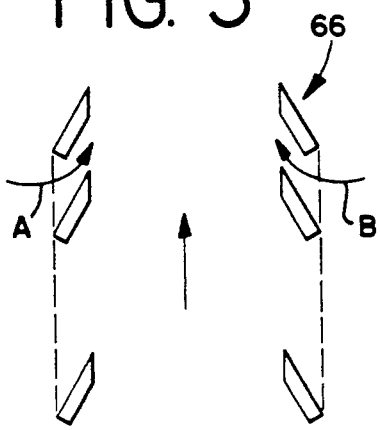
FIG. 3 is a vertical cross section of a second embodiment of a baffle used to guide and direct gas through a catalyst bed.

In FIG. 3, the baffles 66 are horizontally opened so that oil may enter (or leave) the interior of the baffle, as indicated by arrows A, B. To help restrain the radial movement of the gas bubbles, the baffles 66 are somewhat conical to guide and direct the large bubbles back into the center of the baffle if they should tend to stray out of their intended path. The vertical separation between the individual conical baffles 66 should be adequate to permit an almost unencumbered passage of the liquid phase, without unduly facilitating a horizontal movement of gas. In this embodiment the smaller entrained bubbles on the outside of the baffle may be more likely to find their way into the interior of the baffle owing to the conical shape. However, since the gas bubbles tend to follow each other, straight upwardly, there are few problems.

Figure 4:
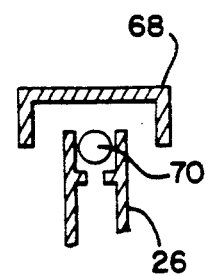
FIG. 4 is a cross section of a bubble cap.

FIG. 4 shows how gas exits from the riser pipe 26. A ball valve 70 permits gas to leave while preventing catalyst from entering the pipe 26.

In an experiment to test the invention, a pilot plant was run with nitrogen and kerosene used as the gas and liquid phases. Experience has demonstrated the reasonableness of these model fluids. The gas and liquid phases were introduced into a chamber (about 35-feet high and 4-feet diameter) in the manner taught by FIG. 1. The tests were run at about 20-30 psi and at ambient temperature. The gas was injected directly into four ports which were equally spaced on a horizontal plane approximately as shown at points 26a-26d (FIG. 2). The gas was emitted into the chamber at points which were about 10-inches from the chamber wall.

Figure 5:
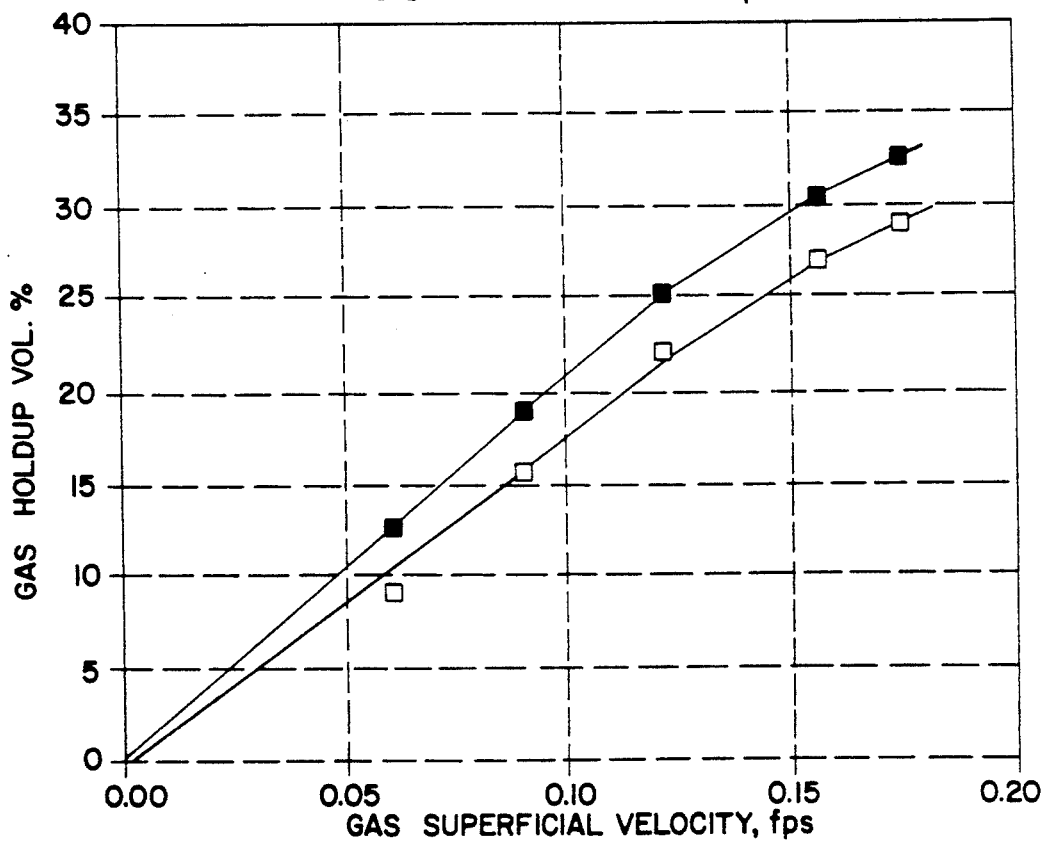
FIG. 5 is a graph which shows how the invention improves the reactor by reducing gas holdup.

FIG. 5 shows the results of the experiment. The black squares show the prior art gas holdup at various gas velocities. The open squares show the holdup at the same gas velocities, when the invention is used (i.e. the gas was introduced above the distributor plate). Since refinery operations are conducted at a gas velocity shown near the right-hand end of these curves, that end of the curves is of most interest. These curves show that at about 0.17 to 0.18 feet per second, the gas holdup was reduced from about 33 volume percent to about 29 volume percent, or with a relative improvement of about 12% (33−29=4; 33÷4=8.25; 100÷8.25=12.12%).

The advantages of the invention should now be apparent. The gas holdup of the catalyst bed is reduced, thereby increasing both the volume and residence or dwell time of the liquid phase within the reactor. Therefore, the extended dwell time causes a significantly greater reaction of the refining process. The "ideal" maintenance of a required minimum hydrogen concentration, without an accumulation of an excess amount of gas volume, is approached closer than has been achieved heretofore. Since there is less gas volume, the thermal reactions are enhanced. This is especially important in refining resid since temperatures are in excess of 700° F.

The invention increases a reduction of Ramsbottom carbon, which relates to a tendency for the resid to form coke. It also increases conversion of residual material.

Another advantage is that the distributor plate 28 operates much more effectively since it is only distributing liquid and not a combination of liquid and gas.

Those who are skilled in the art will readily perceive how to modify the invention. Therefore, the appended claims are to be construed to cover all equivalent structures which fall within the true scope and spirit of the invention.

The claimed invention is:

We claim:

1. A process for reducing gas holdup in a three-phase ebullated bed reactor, said three phases being a mixture of oil, catalyst, and gas, said process comprising the following steps:
   (a) ebullating a catalyst bed in a reactor;
   )b) supporting said bed on a distributor plate displaced from a bottom of said reactor in order to form a plenum below the plate and within the reactor;
   (c) introducing oil into the plenum;
   (d) passing a liquid phase of said oil from said plenum through a plurality of riser pipes penetrating said distributor plate into a space above said distributor plate within said reactor which is occupied by said catalyst bed;
   (e) introducing a hydrogen gas phase into said catalyst bed at a height above said distributor plate so that said gas phase enters the catalyst bed without passing through the plenum or the distributor plate, thereby reducing gas holdup of said ebullated bed; and
   (f) draining a liquid from said reactor at a level above a top of said ebullated catalyst bed.

2. The process of claim 1 wherein said introduction of said gas phase in step (e) releases said gas at a plurality of points in said ebullated bed which are higher than points at which said oil is introduced into said reactor, said higher points being positioned substantially equidistant from and substantially uniformly distributed around a vertical axis of said reactor.

3. The process of claim 2 wherein the introducing of said gas phase in step (e) is at a point below a plurality of vertically oriented baffle means surrounding an area within said ebullated bed of said reactor and enabling an updraft of gas bubbles to pass said baffle means on their upward passage from the point at which said gas is introduced into said catalyst bed while further enabling said liquid phase to distribute itself throughout said bed.

4. The process of claim 3 and the further step of providing vertical slots in a cylinder in order to form said baffle and to control said updraft.

5. The process of claim 3 and the further step of providing a plurality of vertically separated and upwardly pointing conical baffles in order to form said baffles flaring out at their bottoms and control and updraft of gas phase bubbles toward the middle of said baffle.

6. A process for reducing gas holdup in a three-phase ebullated bed reactor employing a mixture of oil, catalyst, and gas, said process comprising the steps of:
   (a) ebullating a bed of catalyst supported on a distributor plate;
   (b) introducing a liquid phase into said reactor from a location beneath said distributor plate for passage of said liquid phase upwardly through said distribute plate into said catalyst bed;
   (c) introducing a gas phase into said catalyst bed at a height above the distributor plate so that gas enters the catalyst bed without moving with the liquid phase below said distributor plate; and
   (d) channeling the gas phase upwardly through a baffle located at least partially within the ebullated catalyst bed, thereby creating an updraft of gas through the baffle which reduces gas holdup of said ebullated bed, said baffle having a lower end located above the distributor plate and below a top level of the ebullated bed.

7. The process of claim 6 and the step of providing said distributor plate at a location near the bottom of said reactor to support said catalyst bed above said distributor plate and to form a plenum below the distributor plate, and step (c) further comprises introducing said gas phase via riser pipes extending through and well above said distributor plate in order to release said gas at positions within said catalyst bed which are sufficiently far above said distributor plates to restrict said path and to reduce said gas hold-up.

8. The process of claim 6 wherein said distributor plate is fixed near the bottom of said reactor in order to separate said reactor into a plenum and a catalyst bed supported on said distributor plate, and further comprising the steps of introducing said liquid phase in step (b) into said plenum, through relatively short riser pipes penetrating said distributor plate and into said catalyst bed, and introducing said gas phase in step (c) through relatively tall riser pipes penetrating said distributor plate and extending upwardly directly into said catalyst bed at a level which is far enough above said distributing plate and tops of said short riser pipes to commit said gas phase to a generally restricted updraft path through said catalyst bed.

* * * * *